(12) United States Patent
Arnold et al.

(10) Patent No.: US 8,924,113 B2
(45) Date of Patent: Dec. 30, 2014

(54) METHOD AND CONTROL DEVICE FOR OPERATING A TRANSMISSION

(71) Applicant: ZF Friedrichshafen AG, Friedrichshafen (DE)

(72) Inventors: Jorg Arnold, Immenstaad (DE); Rainer Denzler, Baienfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/017,490

(22) Filed: Sep. 4, 2013

(65) Prior Publication Data
US 2014/0074362 A1    Mar. 13, 2014

(30) Foreign Application Priority Data

Sep. 13, 2012 (DE) .......................... 10 2012 216 301

(51) Int. Cl.
| | |
|---|---|
| *B60W 10/10* | (2012.01) |
| *B60W 10/11* | (2012.01) |
| *B60W 10/06* | (2006.01) |
| *F16H 61/12* | (2010.01) |

(52) U.S. Cl.
CPC ............. *B60W 10/11* (2013.01); *B60W 10/06* (2013.01); *F16H 61/12* (2013.01)
USPC .......................................................... 701/68

(58) Field of Classification Search
USPC ..................................... 701/67, 68; 477/115
See application file for complete search history.

(56) References Cited

U.S. PATENT DOCUMENTS

| | | | |
|---|---|---|---|
| 8,394,000 B2 | 3/2013 | Popp et al. | |
| 8,496,562 B2 | 7/2013 | Arnold et al. | |
| 2010/0063698 A1* | 3/2010 | Lee et al. | 701/67 |
| 2010/0228412 A1* | 9/2010 | Sah | 701/22 |
| 2011/0054755 A1* | 3/2011 | Yamada | 701/68 |
| 2011/0284335 A1* | 11/2011 | Arnold et al. | 192/3.63 |
| 2011/0295476 A1* | 12/2011 | Ellis | 701/67 |

FOREIGN PATENT DOCUMENTS

| | | |
|---|---|---|
| DE | 10 2008 001 566 A1 | 11/2009 |
| DE | 10 2009 000 253 A1 | 7/2010 |
| DE | 10 2009 056 793 A1 | 6/2011 |
| DE | 10 2010 063 027 A1 | 6/2012 |
| WO | 2012/079847 A1 | 6/2012 |

OTHER PUBLICATIONS

German Search Report issued in corresponding German application mailed Apr. 29, 2013.

* cited by examiner

*Primary Examiner* — Edwin A Young
(74) *Attorney, Agent, or Firm* — Davis & Bujold, PLLC; Michael J. Bujold

(57) ABSTRACT

A method of operating a transmission with interlocking and friction shifting elements. In or to carry out a gearshift from a currently gear to a target gear, one shifting element is disengaged and another is engaged, and if to carry out a gearshift an interlocking shifting element has to be engaged, the interlocking shifting element is synchronized by partially closing a friction shifting element, with redundancy in the transmission, only if a current speed of the vehicle is lower than a limit value. To monitor for possible malfunction, actuation of the shifting elements and the driving speed are monitored and if, based on the actuation of the shifting elements, it is concluded that there is a redundancy in the transmission, a stored non-actual driving speed is compared with the limit value and if the stored driving speed is higher than the limit value, the redundancy in the transmission is eliminated.

3 Claims, 1 Drawing Sheet

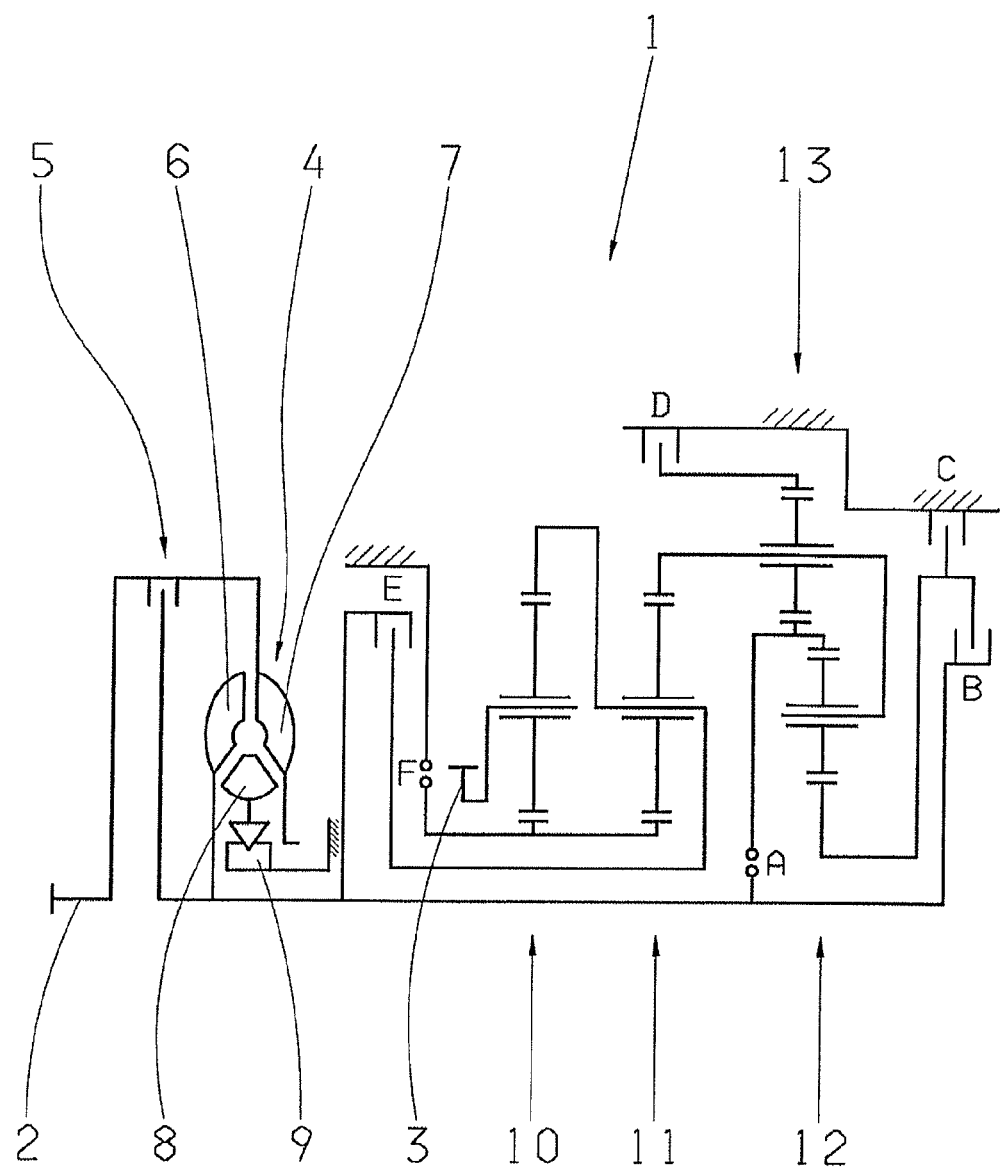

METHOD AND CONTROL DEVICE FOR
OPERATING A TRANSMISSION

This application claims priority from German application serial No. 10 2012 216 301.8 filed Sep. 13, 2012.

FIELD OF THE INVENTION

The invention concerns a method for operating a transmission. In addition the invention concerns a control device for implementing the method.

BACKGROUND OF THE INVENTION

In practice transmissions of motor vehicles with shifting elements are known, which comprise on the one hand interlocking shifting elements and on the other hand friction shifting elements. In each engaged gear of such a transmission a first number of shifting elements of the transmission are closed or engaged and a second number of shifting elements of the transmission are open or disengaged, and when a gearshift is carried out from a currently engaged gear to a target gear, at least one shifting element is opened or disengaged and at least one other shifting element is closed or engaged.

When, to carry out a gearshift or shifting operation in the transmission, an interlocking shifting element has to be closed or engaged, the closing or interlocking of the interlocking shifting element has to take place within a defined rotational speed window around a target rotational speed difference in order to avoid damaging the interlocking shifting element. To ensure this it is already known from practice that to carry out a gearshift in which an interlocking shifting element has to be closed or engaged, the interlocking shifting element is synchronized by at least partially closing a friction shifting element, with redundancy in the transmission.

For example, by at least partially closing a friction shifting element of the transmission, on the one hand a transmission input of the transmission and on the other hand a transmission output of the transmission can be braked in order to synchronize the interlocking shifting element. However, such synchronization of an interlocking shifting element of the transmission with redundancy in the transmission is only permitted at relatively slow driving speeds of the motor vehicle, i.e. when the current driving speed of the motor vehicle is lower than a corresponding limit value.

Since the driving speed of the motor vehicle is determined by rotational speeds on the drive output side, the problem can arise that for example as the result of a blocked drive output, a low current driving speed is estimated even though the motor vehicle is actually driving at a high speed, and because of this a redundancy in the transmission would be permitted even though the driving speed was high. However, to avoid critical driving situations and possible personal injury this eventuality must be securely and reliably avoided. Until now this has only been possible to an inadequate extent.

From DE 10 2009 056 793 A1 a method for operating a transmission is already known, the transmission besides friction shifting elements also comprising an interlocking shifting element, wherein to reduce a rotational speed difference at the interlocking shifting element and to synchronize the same at least one friction shifting element of the transmission is closed.

SUMMARY OF THE INVENTION

Starting from there the purpose of the present invention is to provide a new type of method for operating a transmission and a new type of control device.

This objective is achieved by a method for operating a transmission. Which, for the purpose of monitoring malfunctions on the one hand the actuation of the shifting elements of the transmission, and on the other hand the driving speed of the motor vehicle are monitored, and if the monitoring of the shifting element actuation leads to the conclusion that there is redundancy in the transmission, an intermediately stored, non-actual driving speed of the motor vehicle is compared with the limit value and if the intermediately stored driving speed of the motor vehicle is higher than the limit value, then the redundancy in the transmission is eliminated.

The present invention proposes a malfunction monitoring system for a transmission, with which on the one hand the actuation of the shifting elements of the transmission and on the other hand the driving speed of the motor vehicle are monitored.

If the monitoring of the actuation of the transmission shifting elements leads to the conclusion that there is redundancy in the transmission, then it is not the actual driving speed of the motor vehicle but instead an intermediately stored, non-actual driving speed which is compared with the defined limit value.

If the intermediately stored driving speed of the motor vehicle is higher than the defined limit value, the redundancy in the transmission is eliminated. This makes it possible securely and reliably to avoid unsafe driving situations and personal injuries that can be caused by such driving situations. If when the driving speed is high there should occur an erroneous shifting element actuation which results in redundancy in the transmission, that erroneous actuation can be reliably recognized and eliminated.

Preferably, if the monitoring of the actuation of the transmission shifting elements reveals that there is redundancy in the transmission and in addition the intermediately stored driving speed of the motor vehicle is higher than the defined limit value, the transmission is shifted into neutral. This shift of the transmission to neutral is preferred.

The control device according to the invention is defined herein.

BRIEF DESCRIPTION OF THE DRAWING

Preferred further developments emerge from the description given below. Example embodiments of the invention, to which it is not limited, are explained in more detail with reference to the sole drawing, which shows a schematic representation of a transmission.

DETAILED DESCRIPTION OF THE EMBODIMENT

The present invention concerns a method for operating an automatic or automated transmission, and a control device for implementing the method.

FIG. 1 shows a diagram of a transmission designed as an automatic torque converter, such that the transmission 1 comprises a transmission input shaft 2 and a transmission output shaft 3. A drive aggregate can be coupled to the transmission input shaft 2 and a drive output to the transmission output shaft 3.

The transmission 1 comprises a converter 4 with a converter bridging clutch 5. Of the converter 4 a turbine wheel 6, a pump impeller wheel 7 and a guide wheel 8 are shown, the guide wheel 8 being connected to a so-termed freewheel 9. When the converter bridging clutch 5 is closed the turbine wheel 6 and the pump wheel 7 are coupled to one another.

Besides the converter 4 and the converter bridging clutch 5, the transmission of FIG. 1 comprises a number of gearsets 10, 11, 12, 13 and a number of shifting elements A, B, C, D, E and F. Thus, in the example embodiment shown the transmission comprises six shifting elements A to F, such that the shifting elements A and F are interlocking shifting elements and the shifting elements B, C, D and E being friction shifting elements. In the example embodiment shown the friction shifting elements B and E are clutches and the friction shifting elements C and D are brakes. In each engaged gear, in the transmission 1 of FIG. 1 a first number of shifting elements are closed or engaged and a second number of shifting elements are open or disengaged.

The table below shows, for the nine forward gears 1 to 9 and for the reverse gear R, in each case, the shifting elements which are closed or engaged and open or disengaged in each gear.

|   | A | B | C | D | E | F |
|---|---|---|---|---|---|---|
| R |   | X |   | X |   | X |
| 1 | X |   |   | X |   | X |
| 2 | X |   | X |   |   | X |
| 3 | X | X |   |   |   | X |
| 4 | X |   |   |   | X | X |
| 5 | X | X |   |   | X |   |
| 6 | X |   | X |   | X |   |
| 7 | X |   |   | X | X |   |
| 8 |   |   | X | X | X |   |
| 9 |   | X |   | X | X |   |

In the above table the closed or engaged shifting elements are in each case indicated by an X. From the table it follows that in each engaged gear in the transmission 1 three shifting elements are closed or engaged and three shifting elements are open or disengaged.

Now if, for instance in the example embodiment of a transmission 1 shown, a gearshift is to be carried out from the currently engaged gear R to the target gear 1, then in the transmission of FIG. 1 the interlocking shifting element A has to be closed or engaged. Moreover, for a gearshift from the current gear 8 to the target gear 7 the interlocking shifting element A again has to be closed or engaged.

From practice it is already known that for the synchronization of an interlocking shifting element that is to be closed, another, previously open frictional shifting element has to be closed briefly with redundancy in the transmission 1, since by closing a frictional shifting element the transmission 1 is braked on its input side and on its output side and in this way the interlocking shifting element that is to be closed can be synchronized. However, this is only permitted if the current driving speed of the motor vehicle is lower than a corresponding limit value. But if the current driving speed of the motor vehicle is higher than the limit value, synchronization of an interlocking shifting element by partially closing a frictional shifting element with redundancy in the transmission is not permitted.

According to the invention, malfunction monitoring for the actuation of the shifting elements of the transmission is proposed, whereby at high driving speeds and in the event of erroneous actuation of the shifting elements redundancy in the transmission is reliably recognized and eliminated so that in the sense of the invention, for the malfunction monitoring on the one hand the actuation of the shifting elements of the transmission and on the other hand the driving speed of the motor vehicle are monitored. The driving speed of the motor vehicle is preferably computed from a rotational speed on the drive output side, for example a rotational speed of the transmission output shaft 3 of the transmission 1.

If on the basis of the monitored actuation of the shifting elements of the transmission 1 it is concluded that there is redundancy in the transmission 1, and if an intermediately stored, non-actual driving speed of the motor vehicle is higher than the corresponding limit value, it is concluded that the shifting elements of the transmission 1 have been erroneously actuated and the redundancy in the transmission 1 is eliminated.

Thus, the malfunction monitoring is based not on the actual driving speed of the motor vehicle but on a non-actual, intermediately stored driving speed thereof. In this way it can be avoided that if the drive output is blocked at a high driving speed, it is erroneously concluded that the driving speed is low so that a redundancy in the transmission is permitted. Thereby, the operation of a transmission having at least one interlocking shifting element and a plurality of friction shifting elements can be improved.

If on the basis of the monitored actuation of the shifting elements of the transmission 1 it is concluded that there is redundancy in the transmission 1 and if, in addition, the intermediately stored driving speed of the motor vehicle is higher than the limit value, the redundancy in the transmission 1 is preferably eliminated by shifting the transmission 1 to neutral. On the other hand it is also possible to change the actuation of the shifting elements of the transmission 1 in such manner that while the redundancy is eliminated, the current gear remains engaged.

Accordingly, with the help of the invention it is possible at low driving speeds to permit a brief redundancy in the transmission 1 whereas at high driving speeds a redundancy is recognized unambiguously as a fault and the redundancy can be reliably eliminated.

The method according to the invention is preferably implemented by a control device according to the invention, preferably a transmission control device. To implement the method according to the invention the transmission control device exchanges data with the transmission 1 by way of data interfaces in order to send to the shifting elements appropriate actuation signals for opening or closing them.

The control device according to the invention that implements the method according to the invention has a processor for carrying out the method according to the invention and making calculations required for the purpose. In addition the control device according to the invention has a memory for the storage of process data while implementing the method according to the invention, for the driving speed of the motor vehicle.

Details of the connection of the control device, in particular the transmission control device, to the transmission 1, for example by way of a data bus, are well understood by those appropriately familiar with the field and therefore require no further explanation.

INDEXES

1 Transmission
2 Transmission input shaft
3 Transmission output shaft
4 Converter
5 Converter bridging clutch
6 Turbine wheel
7 Pump wheel
8 Guide wheel
9 Freewheel
10 Gearset 11 Gearset
12 Gearset
13 Gearset

The invention claimed is:

1. A method for operating a transmission of a motor vehicle that comprises a plurality of shifting elements including at least one interlocking shifting element and a plurality of friction shifting elements, in each engaged gear, a first number of the shifting elements of the transmission are either closed or engaged and a second number of the shifting elements of the transmission are either open or disengaged, and when carrying out a gearshift from a currently engaged gear to a target gear at least one of the shifting elements is either opened or disengaged and at least one of the shifting elements is either closed or engaged, and if, to carry out the gearshift, one interlocking shifting element has to be either closed or engaged, a synchronization of the one interlocking shifting element by at least partially closing or engaging one friction shifting element with redundancy in the transmission is only permitted provided that a current driving speed of the motor vehicle is lower than a corresponding limit value, the method comprising the steps of:

monitoring actuation of the shifting elements of the transmission and the driving speed of the motor vehicle for monitoring a possible malfunction;

comparing an intermediately stored, non-actual driving speed of the motor vehicle with the corresponding limit value, if, on a basis of the monitored actuation of the shifting elements of the transmission, it is concluded that there is a redundancy in the transmission; and if the intermediately stored, non-actual driving speed of the motor vehicle is higher than the corresponding limit value, eliminating the redundancy in the transmission.

2. The method according to claim 1, further comprising the step of:

if, on the basis of the monitored actuation of the shifting elements of the transmission, it is concluded that there is redundancy in the transmission and if the intermediately stored, non-actual driving speed of the motor vehicle is higher than the corresponding limit value, shifting the transmission into neutral.

3. A control device for a transmission which comprises a means for implementing a method of operating the transmission of a motor vehicle that comprises a plurality of transmission shifting elements including at least one interlocking shifting element and a plurality of friction shifting elements, for each engaged gear a first number of the shifting elements of the transmission are either closed or engaged and a second number of the shifting elements of the transmission are either open or disengaged, and when carrying out a gearshift from a currently engaged gear to a target gear at least one of the shifting elements is either opened or disengaged and at least one of the shifting elements is either closed or engaged, and if, to carry out the gearshift, one interlocking shifting element has to be either closed or engaged, a synchronization of the one interlocking shifting element by at least partially closing or engaging one friction shifting element in which a redundancy in the transmission is only permitted provided that a current driving speed of the motor vehicle is lower than a corresponding limit value, the method of operating the transmission including the steps of monitoring actuation of the shifting elements of the transmission and the driving speed of the motor vehicle to monitor for a possible malfunction, comparing an intermediately stored, non-actual driving speed of the motor vehicle with the corresponding limit value, if, on the basis of the monitored actuation of the shifting elements of the transmission, it is concluded that there is a redundancy in the transmission, and if the intermediately stored, non-actual driving speed of the motor vehicle is higher than the corresponding limit value, eliminating the redundancy in the transmission.

* * * * *